United States Patent
Manikoth et al.

(10) Patent No.: US 10,260,154 B2
(45) Date of Patent: Apr. 16, 2019

(54) METHOD FOR THE SYNTHESIS OF LAYERED LUMINESCENT TRANSITION METAL DICHALCOGENIDE QUANTUM DOTS

(71) Applicant: INDIAN INSTITUTE OF SCIENCE EDUCATION AND RESEARCH, THIRUVANANTHAPURAM (IISER-TVM), Trivandrum, Kerala (IN)

(72) Inventors: Shaijumon Mancheri Manikoth, Trivandrum (IN); Dijo Damien, Thrissur (IN); Deepesh Gopalakrishnan, Palakkad (IN)

( * ) Notice: Subject to any disclaimer, the term of this patent is extended or adjusted under 35 U.S.C. 154(b) by 347 days.

(21) Appl. No.: 15/224,701

(22) Filed: Aug. 1, 2016

(65) Prior Publication Data
US 2017/0029962 A1    Feb. 2, 2017

(30) Foreign Application Priority Data
Aug. 1, 2015    (IN) .......................... 4004/CHE/2015

(51) Int. Cl.
| | | |
|---|---|---|
| C25B 1/00 | (2006.01) | |
| C25B 9/00 | (2006.01) | |
| C01B 19/00 | (2006.01) | |
| C01G 39/06 | (2006.01) | |
| C09K 11/88 | (2006.01) | |
| C01G 39/00 | (2006.01) | |
| C01G 41/00 | (2006.01) | |
| B82Y 40/00 | (2011.01) | |
| B82Y 20/00 | (2011.01) | |
| B82Y 30/00 | (2011.01) | |

(52) U.S. Cl.
CPC .............. *C25B 1/00* (2013.01); *C01B 19/007* (2013.01); *C01G 39/00* (2013.01); *C01G 39/06* (2013.01); *C01G 41/00* (2013.01); *C09K 11/881* (2013.01); *C25B 9/00* (2013.01); *B82Y 20/00* (2013.01); *B82Y 30/00* (2013.01); *B82Y 40/00* (2013.01); *C01P 2002/85* (2013.01); *C01P 2004/03* (2013.01); *C01P 2004/04* (2013.01); *C01P 2004/64* (2013.01); *Y10S 977/774* (2013.01); *Y10S 977/899* (2013.01); *Y10S 977/95* (2013.01)

(58) Field of Classification Search
CPC ........... C25B 1/00; C25B 9/00; C01B 19/007; C01G 39/00; C01G 39/06; C01G 41/00; C01K 11/881
USPC ......................................................... 428/402
See application file for complete search history.

(56) References Cited

U.S. PATENT DOCUMENTS

| | | | |
|---|---|---|---|
| 9,309,124 B2 * | 4/2016 | Loh .......... | B01J 21/185 |
| 9,954,188 B2 * | 4/2018 | Kumar ...... | C08K 9/02 |
| 2013/0102084 A1 * | 4/2013 | Loh .......... | B01J 21/185 436/94 |
| 2015/0380665 A1 * | 12/2015 | Kumar ...... | C08K 9/02 136/263 |
| 2018/0186645 A1 * | 7/2018 | Xu ............ | C01B 32/198 |
| 2018/0190913 A1 * | 7/2018 | Kumar ...... | C08K 9/02 |

FOREIGN PATENT DOCUMENTS

| | | | |
|---|---|---|---|
| WO | WO2011162727 | * | 1/2011 |
| WO | WO2014132183 | * | 6/2014 |
| WO | WO2017000731 | * | 5/2017 |

OTHER PUBLICATIONS

Pradhan, N. R. et al., Intrinsic carrier mobility of multi-layered $MoS_2$ field-effect transistors on SiO. Applied Physics Letters 2013, 102, 123105.

Eda, G. et al., Photoluminescence from Chemically Exfoliated $MoS_2$. Nano Letters 2011, 11, 5111-5116.

Hernandez, Y. et al., High-yield production of graphene by liquid-phase exfoliation of graphite. Nature Nanotechnology 2008, 3, 563-568.

Coleman, J. N et al., Two-Dimensional Nanosheets Produced by Liquid Exfoliation of Layered Materials. Science 2011, 331, 568.

* cited by examiner

Primary Examiner — Leszek B Kiliman (57) ABSTRACT

The invention discloses a method for the synthesis of monodispersed luminescent quantum dots of transition metal dichalcogenides (TMDC), single- or few-layered, using a single-step electrochemical exfoliation that involves dilute ionic liquid and water. The method disclosed helps to obtain nanoclusters of TMDC of desired size including small sizes ranging up to 6 nm, by varying the concentration of the electrolyte and the applied DC voltage. The invention further discloses a method by which mono- or few-layered luminescent transition metal dichalcogenides can be directly deposited onto conducting substrates in a uniform manner. The monodispersed single- or few-layered luminescent TMDC and electro-deposited substrates exhibit improved electronic conductivity and new active sites, making them suitable as high-performance electrocatalysts in hydrogen evolution reactions in solar water-splitting applications and also as electrodes for solar cell applications.

18 Claims, 11 Drawing Sheets

METHOD FOR THE SYNTHESIS OF LAYERED LUMINESCENT TRANSITION METAL DICHALCOGENIDE QUANTUM DOTS

PRIORITY PARAGRAPH

This application claims priority to Indian patent application No. 4004/CHE/2015 filed on Aug. 1, 2015 titled "A single step method for the synthesis of molybdenum disulfide quantum dots" and is incorporated herein by reference.

BACKGROUND

Experimental realization of ultrathin graphene nanosheets opened up a new horizon for the academic and applied research. Even though graphene exhibits numerous unusual physical properties and applications thereof, its semi-metallic nature disables graphene to be used in optical/electronic applications. Semi-conducting inorganic analogues of graphite-like transition metal dichalcogenides (TMDs) are one of the most attractive alternatives for such applications. Molybdenum disulfide ($MoS_2$) is well studied and shows an interesting layered structure as well as unusual physical properties. Reports such as Applied Physics Letters 2013, 102 (12), demonstrate that $MoS_2$-based electronic devices out-perform graphene-based ones. Nano Lett. 2011, (11 (12), 5111-5116) describes that the bulk $MoS_2$ has an indirect bang gap of 1.2 eV and does not show photoluminescence properties; whereas electronic properties of monolayered $MoS_2$ change drastically resulting in a direct band gap semi-conductor with a band gap of 1.9 eV. When the ultra-thin $MoS_2$ nanosheets are confined to zero-dimension (0D), the quantum size effects, and the edge effects become very significant. However, the synthesis and characterization of $MoS_2$ nanoclusters is still in its infancy. Previously reported methods are very tedious and/or yield polydisperse distribution of particles. Existing techniques to yield high quality thin layer $MoS_2$ nanosheets or nanoparticles include solvent exfoliation and mechanical exfoliation. However, both these techniques fail in the large-scale exfoliation of TMDs.

Since graphene as well as $MoS_2$ layers are held together by common force called van der Waals forces, exfoliation techniques adopted for graphene can be easily extrapolated for $MoS_2$ as well. Coleman and co-workers have established the exfoliation of graphite and $MoS_2$ using solvent exfoliation methods in organic solvents in Nat. Nanotech. 2008, 3 (9), 563-568 and Science 2011, 331 (6017), 568-571. However, in their approach, only a few layered sheets of graphene and $MoS_2$ have been obtained. As already known, extraction of materials from solvent exfoliation route is very difficult for any practical application. Hence, it is important to develop new methods to synthesize dichalcogenide quantum dots having formula $MX_2$ with single or few layers in a simple, cost-effective, environment-friendly manner. Further, direct deposition of these nanoparticles onto conducting substrates could lead to enhanced electronic conductivity.

SUMMARY

Disclosed herein are mono- and few-layered luminescent transition metal dichalcogenides quantum dots and electrochemical methods to prepare them. In one embodiment, a method of synthesizing quantum dots is by providing an electrochemical cell comprising an anode, a cathode, and an electrolytic solution, wherein the anode and the cathode are formed from a dichalcogenide material, and applying an electric potential between the anode and the cathode for a suitable period to form quantum dots in the electrolytic solution.

In an embodiment, the dichalcogenides have a general formula $MX_2$, wherein M is selected from a group consisting of one or more group VI metals, and X is a chalcogen selected from a group consisting of S, Se, Te or Po.

In another embodiment a method of synthesizing quantum dots is by providing an electrochemical cell comprising an anode, a cathode, and an electrolytic solution, wherein the anode is formed from a dichalcogenide material and the cathode is formed from a conducting substrate and applying an electric potential between the anode and the cathode for a suitable period to form deposition of quantum dots on the electrode. The dichalcogenides have a general formula $MX_2$, wherein M is selected from a group consisting of one or more group VI metals, and X is a chalcogen selected from a group consisting of S, Se, Te or Po.

Nanosheets of luminescent dichalcogenides particles having a general formula $MX_2$ wherein M is selected from the group consisting of Mo and W, and X is selected from the group consisting of S or Se, and particle size of less than 10 nm and comprising one or more layered nanosheets are also disclosed.

OBJECTS OF THE INVENTION

The primary object of the present invention is to provide a method for the synthesis of luminescent single- or few-layered dichalcogenide nanoclusters represented by the formula $MX_2$.

A further object of the invention is to provide a single step electrochemical method using an electrolyte containing ionic liquid/organic salt and water.

Yet another object of the invention is to provide high quality single or few-layered dichalcogenide nanoclusters or quantum dots with direct band gap.

Another object of the present invention is to provide a method to obtain molybdenum disulfide ($MoS_2$) nanoclusters of desired size with ease, including small sizes ranging from 2.5 nm to 6 nm. Yet another object of the present invention is to synthesize these nanoclusters by employing a very low DC voltage potential of less than 5V across twin $MoS_2/MoSe_2$ electrodes in a very dilute aq. electrolyte bath at room temperature.

Another object of the present invention is to provide said luminescent nanoclusters that are stable and has very narrow size distribution.

Another important object of the present invention is to provide a single step route to directly deposit the said luminescent nanoclusters onto any conducting substrates that would result in their enhanced conductivity and formation of new active sites.

Other features and advantages of the present invention will be apparent from the following more detailed description of the preferred embodiment, taken in conjunction with the accompanying drawings which illustrate, by way of example, the principles of the invention.

DESCRIPTION OF THE INVENTION

The invention will now be described in relation to specific embodiments, wherein the amounts of the main components in the electrolyte in low concentraion and the voltage applied, is critical for synthesizing and obtaining single- or few-layered dichalcogenide quantum dots with a size below 10 nm.

The present invention provides a novel method to synthesize luminescent dichalcogenides having a general formula $MX_2$ wherein M is selected from a group consisting of Mo or W and X is selected from a group consisting of S or Se, preferably $MoS_2$ or $MoSe_2$, $WS_2$, $WSe_2$ that is, molybdenum/tungsten disulphide ($MoS_2/WS_2$) and molybdenum diselenide ($MoSe_2/MoSe_2$) quantum dots following a single step electrochemical method using an electrolyte containing ionic liquid/organic salt and water.

In an embodiment, the bulk $MX_2$ material is exfoliated to form single- or few-layered $MX_2$ quantum dots. The exfoliation mechanism of the current invention includes simple concerted action of the anodic oxidation and anion intercalation, which can produce mono-dispersed quantum dots into the aq. electrolyte solution itself under the application of a DC voltage. Changing the concentration of the electrolyte and the potential applied for the exfoliation can vary the size of the $MX_2$ quantum dots obtained.

One advantage of the present invention is its simplicity to synthesize the nanostructured materials via simple, cost effective, and green approach.

Another advantage of the present invention of the synthesized $MX_2$ quantum dots is its use as high performance electrocatalysts for HER; for example, it can be used in solar water-splitting applications.

In an embodiment, the invention provides an effective method for a very fast growth of $MoS_2$ and $MoSe_2$ nanoclusters of various sizes. These clusters were obtained by applying a constant DC potential of 5V across LiTFSI or [BMIm]Cl of various concentrations viz. 0.1, 1 and 5 wt. %. The elelctrolyte solution may also include other materials to tailor the properties and size of the nanoclusters.

Another aspect of the invention is directed towards providing aq.—based very dilute electrolytes making the entire method cost effective and eco-friendly. The use of dilute aqeuous electrolyte and the application of the potential much higher than the electrochemical window of the electrolyte, leads to formation of exotic or reactive hydroxyl and oxygen free radicals triggering the exfoliation.

In another aspect of the invention, through a single-step method, these nanoclusters can be directly deposited onto any conducting substrate. Such electrodeposited materials can directly be used for various application as they show enhanced electrocatlaytic performance towards HER (water splitting), owing to the improved electronic conductivity and the emergence of new active sites.

In yet another embodiment of the invention $MX_2$ discs (diameter 1 cm) made from commercially available flakes, were placed in an electrochemical cell in aq. LiTFSI or [BMIm]Cl of various concentrations viz. 0.1, 1 and 5 wt. %. A constant potential of 5V is applied to between the electrodes for a suitable time, at room temperature. In yet another embodiment, the electrolyte solution is reacted for a period of time from about 0.5 hour to about 5 hours.

Furthermore, this solution was centrifuged and the supernatant solution was collected and analyzed further.

Therefore, in the advantageous method of the present invention, because of the very dilute aq. electrolyte and the potential applied much higher than the electrochemical window of the electrolyte, exotic or reactive hydroxyl and oxygen free radical formation happens and which trigger the exfoliation of the dichalcogenides into a single or few layered nanoclusters. In a further embodiment, the dichalcogenides thus obtained is few layered, preferably mono or less than or equal to three layers.

In other embodiments, suitably selected other room temperature ionic liquids (RTIL) can also be used such as [BMIm]Cl, 1-ethyl-3-methylimidazolium chloride ([EMIm] Cl) or any Room Temperature ionic liquid (RTIL) and any organic salt may be used including LiTFSI, Lithium perchlorate ($LiClO_4$), Sodium perchlorate ($NaClO_4$), Lithium hexafluoro arsenate ($LiAsF_6$) or any quaternary phosphonium salts and/or a combination thereof or any quaternary phosphonium salts.

In further embodiments, by varying the concentration and voltage, $MX_2$ nanoclusters with varying sizes can be obtained. Increasing the water/Ionic Liquid ratio results in large concentration of the OH and O radicals, which further lead to vigorous exfoliation of the bulk $MoS_2$ in to nanoclusters of smaller size. As the concentration is increased from 0.1 wt. % to 1 wt. % for example of LiTFSI, the size of as formed $MX_2$ clusters was found to vary from ~2.0 nm to ~4.5 nm. While, it was observed that the size of quantum dots also varied from ~3.8 nm to ~6 nm for the same variation of concentration (i.e. 0.1 wt. % to 1 wt. %) of [BMIm]Cl. Variation of the applied voltage also results in the varied magnitude of corrosion occurring at the edge sites and defects, leading to expansion and cleavage of the material. It is also observed that the method as mentioned can also be used for other materials to form layered structures such as black phosphorous.

In an embodiment of the invention a method for synthesizing layered luminescent transition metal dichalcogenides is provided wherein dichalcogenide powder is pelletized under a constant pressure followed by preparing a first electrode with a dichalcogenide pellet as an anode and a second electrode with a conducting substrate as a cathode; a low concentration of electrolyte solution for the electrochemical exfoliation either by mixing ionic liquids or organic salts in a suitable solvent is prepared; a portion of the first electrode and a portion of the second electrode is immersed, in the electrolyte solution; an electric potential between the anode and the cathode is applied, to form reactive hydroxyl and oxygen free radicals along with electrolyte ions and triggering an exfoliation of layered nanoclusters in the electrolyte solution, at room temperature for a predetermined time period; obtaining the exfoliated layered nanoclusters in the form of supernatant from the solution using centrifugal forces or continuing the electric field till the said nanoclusters seperates from the electrolyte solution and drifts towards the cathode forming a uniform deposition of the dichalcogenide quantum dots on the surface of the said cathode; obtaining the exfoliated layered nanoclusters from the solution either by using centrifugal forces, by collecting supernatant or obtaining electrode having uniform deposition of the dichalcogenide quantum dots on the surface by continuing the electric field till the said nanoclusters seperates from the electrolyte solution and drifts towards the cathode; and/or co-depositing the said electrolyte ions on to the cathode.

In a further embodiment the Li ions present in the electrolyte solution is co-deposited onto the negative electrode (cathode), forming lithiated dichalcogenide, resulting in improved electronic conductivities. Under the applied electric field, LiTFSI salt undergoes decomposition into Li ions, which get deposited onto the negative conducting electrode, during which it reacts with the co-deposited $MX_2$ nanoclusters to form lithiated $MX_2$.

It is also an aspect of the present invention in which luminescent transition metal dichalcogenides having a general formula $MX_2$ is provided, wherein M is selected from a group consisting of Mo or W and X is selected from a group consisting of S or Se, preferably $MoS_2$ or $MoSe_2$, $WS_2$, $WSe_2$, having an average particle size below 10 nm, preferably in the size range of 2.0 nm to 6 nm.

The preferred embodiments of the present invention are now described by the following examples. These examples are illustrative in nature and will make it possible to understand the invention better and shall not be considered as limiting the scope of the invention.

EXAMPLES

Example 1

Electrochemical Exfoliation of $MoS_2$ and $MoSe_2$ and Preparation Method of the Luminescent Molybdenum Disulphide ($MoS_2$) and Molybdenum Diselenide ($MoSe_2$) Quantum Dots Molybdenum disulfide ($MoS_2$) and molybdenum diselenide ($MoSe_2$) flakes, Ionic Liquids commercially available as LiTFSI salt, [BMIm]Cl from Sigma Aldrich, were used as received without any further purification. In a typical example, the electrolyte for the electrochemical exfoliation was prepared by mixing LiTFSI with de-ionized water (0.1 wt. % and 1 wt. %).

Pelletized $MoS_2/MoSe_2$ discs made from commercially available flakes, were placed in an electrochemical cell with 1 cm apart in aq. LiTFSI or [BMIm]Cl of the following concentrations: 0.1, 1 and 5 wt. %. A constant potential of 5V was applied to between the electrodes for 3 hours, at 25° C. This solution was centrifuged for 1 h at 6000 rpm. The supernatant solution was collected and analyzed further. The method can be carried out using several other RTILs such as [BMIm]Cl, [EMIm]Cl or any RTIL and any organic salt may be used including LiTFSI, $LiClO_4$, $NaClO_4$, $LiAsF_6$ or any quaternary phosphonium salts. By varying the concentration and voltage, $MoS_2$ nanoclusters with varying sizes were obtained. Increasing the water/ionic liquid ratio results in large concentration of the OH and O radicals, which further lead to vigorous exfoliation of the bulk $MoS_2$ in to nanoclusters of smaller size. As the concentration increased from 0.1 wt. % to 1 wt. % of LiTFSI, the size of as formed $MoS_2$ clusters was found to vary from ~2.5 nm to ~4.5 nm. It is also observed that the size of quantum dots varied from ~3.8 nm to ~6 nm for the same variation of concentration (i.e. 0.1 wt % to 1 wt %) of [BMIm]Cl.

Example 2

Direct Deposition of Molybdenum Diselenide ($MoSe_2$) Quantum Dots onto Conducting Substrates In yet another aspect of the present invention, electrochemical exfoliation method was employed for synthesizing $MoSe_2$ nanocrystals, starting from their bulk, by using 0.1 wt % aq. LiTFSI electrolyte under a constant applied DC potential of 5 V. In a typical synthesis, 500 mg of $MoSe_2$ powder was pelletized by applying a pressure of 5 tons/cm$^2$. This pellet was employed as anode and conducting substrates of choice viz. gold, FTO or similar material can be used as cathode for the electrochemical exfoliation. The electrodes were placed in an electrochemical cell 1 cm apart, in 0.1 wt. % aq. LiTFSI electrolyte. The exfoliated electrolyte solution contains a mixture of several exfoliation/oxidation/decomposition products whose composition is much complex to elucidate. However, a drift of the exfoliation products towards the negative electrode was observed as the exfoliation proceeded and a uniform coating was observed on the cathode surface. $MoSe_2$ nanoclusters simultaneously were deposited onto the conducting electrode.

Example 3

Electrochemical Preparation of Quantum Dots of $WS_2/WSe_2$ and Direct Deposition on Conducting Substrates for Energy Applications Following similar protocols described in Example 1-3, quantum dots of $WS_2/WSe_2$ is also synthesized and was directly deposited onto transparent conducting substrates/gold foil for energy harvesting or conversion applications. $WS_2$ quantum dots are particularly interesting for electrocatalytic hydrogen evolution because of the favorable thermoneutral chemistry of metal/chalcogenide edges.

Electrochemical HER Measurements of $MoS_2$ Quantum Dots

Electrochemical HER measurements were carried out using three-electrode cell with 0.5 M $H_2SO_4$ as electrolyte. As synthesized $MoS_2$ quantum dots with 5 wt. % nafion solution was drop-casted onto glassy carbon electrode and dried at room temperature, which acts as working electrode. Pt wire auxiliary electrode and Ag/AgCl were used as counter and reference electrodes respectively. The performance of the catalyst towards hydrogen evolution was measured using linear sweep voltammetry by applying a potential ranging from +0.3V to −0.45V vs standard hydrogen electrode with a scan rate of 2 mV/s.

Characterization of $MoS_2$ Quantum Dots

Figure 1:
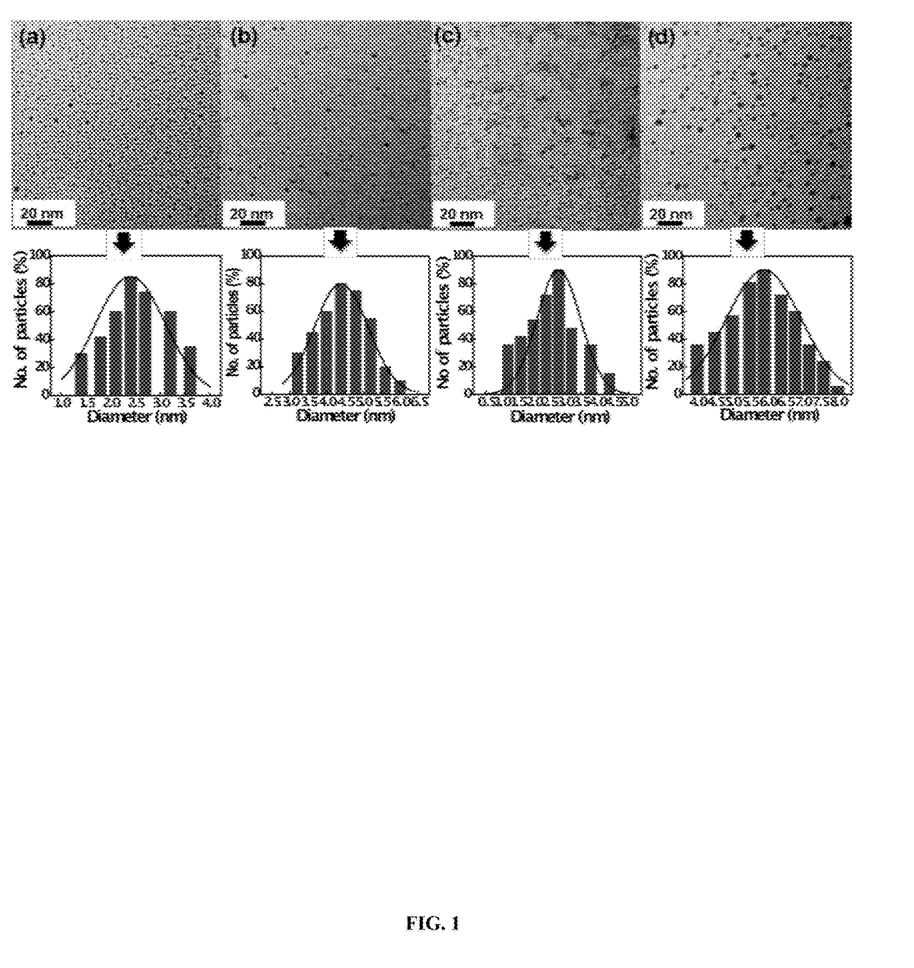
FIG. 1 is a high-resolution transmission electron microscopy (HR-TEM) images of electrochemically synthesized $MoS_2$ nanoclusters obtained at an applied potential of 5 V. (A) and (B) show the nanoclusters obtained using aq. lithium bis(trifluoromethylsulphonyl)imide (LiTFSI) of the concentration 0.1 and 1 wt. % respectively, (C) and (D) correspond to the clusters synthesized using aq. 1-Butyl-3-methylimidazolium chloride ([BMIm]Cl) of the concentration 0.1 and 1 wt. % respectively. Particle size distribution corresponding to each condition is given at the bottom panel.
Figure 2:
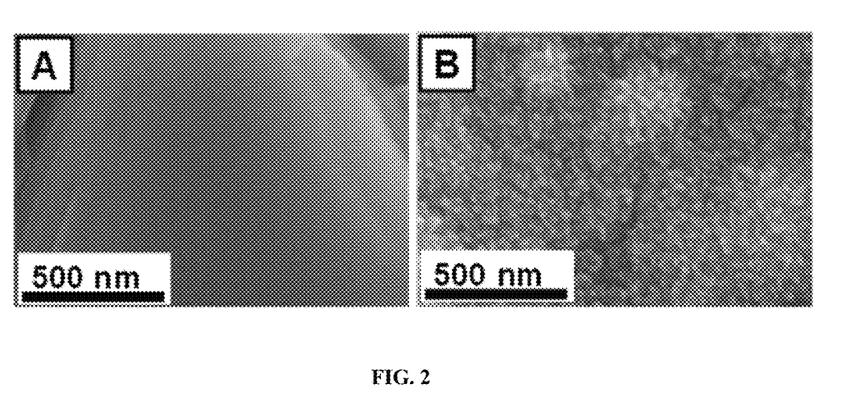
FIG. 2 is scanning electron microscopy (SEM) images of the bulk $MoS_2$ anode surface before the electrochemical exfoliation (A) and after the electrochemical exfoliation (B). Surface roughening results from the dissolution $MoS_2$ nanoclusters from the surface of the anode.
Figure 3:
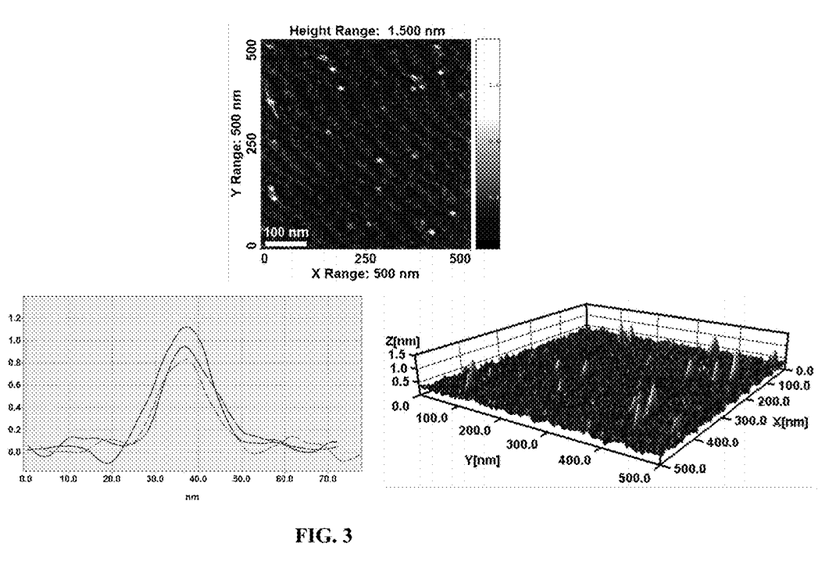
FIG. 3 is an atomic force microscopy (AFM) image and the height profile of $MoS_2$ quantum dots, confirming a thickness of ~1.5 nm.
Figure 4:
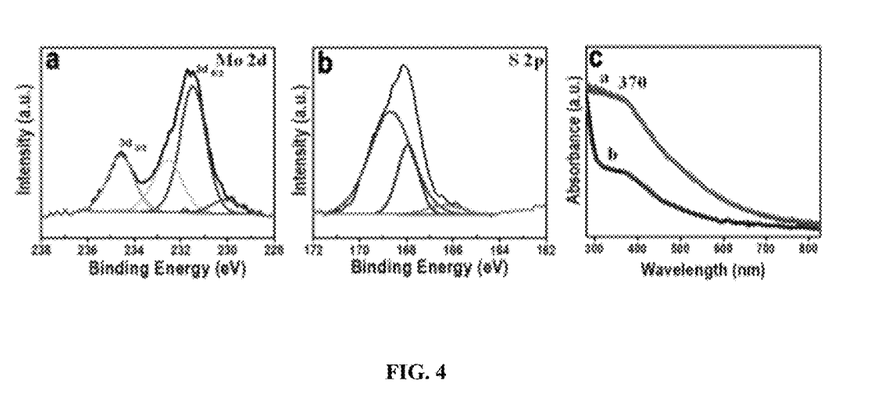
FIG. 4 is XPS spectra of as formed $MoS_2$ nanoclusters showing phase composition of Mo and S. (A) represents Mo 3d spectra and (B) represents S 2p spectra. Subtle changes in the binding energies indicate slight oxidation of the Mo and S edges during the electrochemical exfoliation. (C) shows the UV-Vis absorption spectrum of (a) $MoS_2$ nanoclusters synthesized using [BMIm]Cl and (b) using LiTFSI
Figure 5:
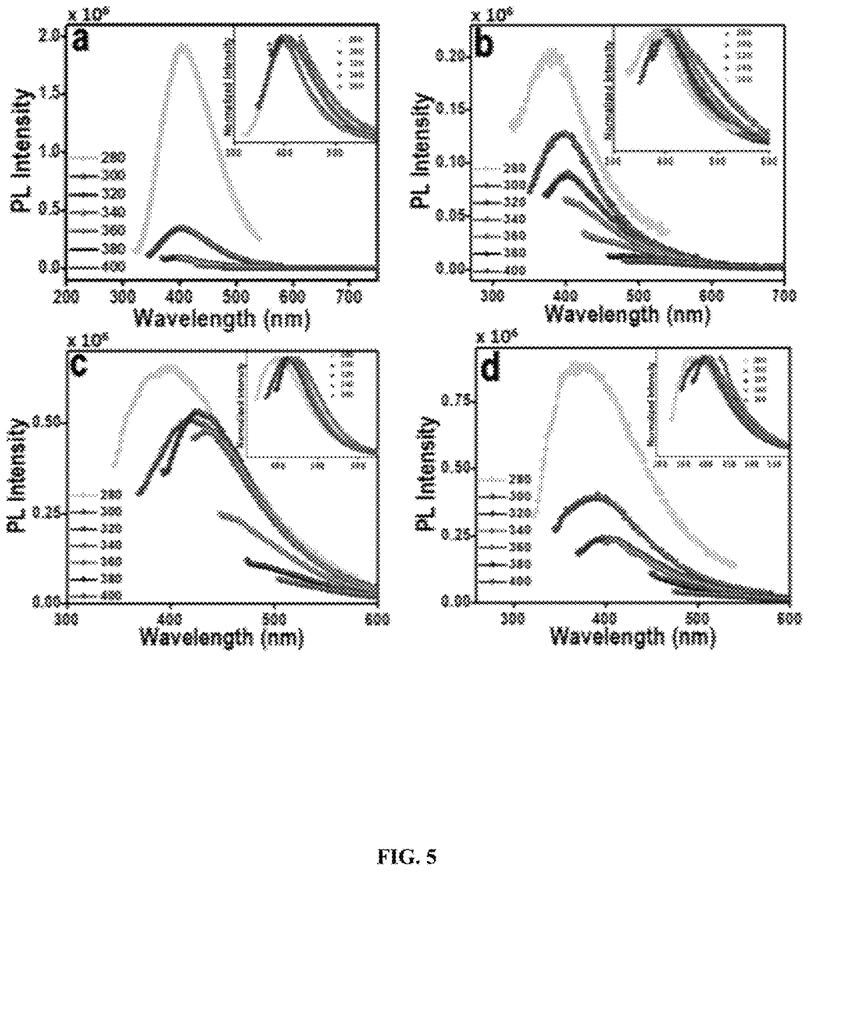
FIG. 5 shows the photoluminescence spectra of $MoS_2$ nanoclusters at 5V with 0.1 wt % (A) and 1 wt % (B) of LiTFSI. C and D show the photoluminescence spectra of MoS2 nanoclusters at 5V with 0.1 wt % and 1 wt % of [BMIm]Cl respectively.

Molybdenum disulphide ($MoS_2$) quantum dots have been characterized using several spectroscopic and microscopic tools such as ultraviolet-visible absorption spectroscopy, photoluminescence spectroscopy, X-ray photoelectron spectroscopy (XPS), TEM and SEM. TEM analysis of the exfoliated sample shows the uniform distribution of $MoS_2$ nanoclusters of various sizes formed in two different electrolytes at two different concentrations (FIG. 1). LiTFSI based electrolyte yields particles of the size 2.5 nm and 4.5 nm with electrolyte concentration of 0.1 and 1 wt. % respectively. Whereas [BMIm]Cl based electrolytes leads to slightly bigger particles of size viz., 3 nm and 6 nm at two different concentrations. Aq. based very dilute electrolytes were chosen deliberately to make the method low cost and eco-friendly. Because of the very dilute aq. electrolyte and the potential applied much higher than the electrochemical window of the electrolyte, exotic hydroxyl and oxygen free radical formation happens and which trigger the exfoliation. As the time progresses, the $MoS_2$ anode swells by the incorporation of $TFSI^-$ and $Cl_3^-$ anions respectively in LiTFSI and [BMIm]Cl based electrolytes and $MoS_2$ nanoclusters start dissolving in the electrolyte. This dissolution coarsens the surface of bulk $MoS_2$ pellet employed as the anode (FIG. 2). However this would lead to oxidation of Mo and S edges in the nanoclusters formed as confirmed from the XPS analysis (FIG. 3). Pristine $MoS_2$ exhibits Mo3d5/2, Mo3d3/2 and S2p3/2 binding energy at 229.4 eV, 232.5 eV and 162.2 eV respectively. Even though this oxidation will manipulate the electronic properties of pristine $MoS_2$, for several applications like HER it becomes advantageous because of the enhanced edge to basal ratio. To confirm the thickness of the as-formed $MoS_2$ quantum dots, AFM images have been analyzed (FIG. 4). As shown in the height profile of AFM, particles of uniform thickness ~1.0 nm have been obtained, indicating monolayer structure of $MoS_2$ quantum dots. Electronic absorption spectra of the exfoliated samples (FIG. 5) shed light on the formation of $MoS_2$ nanoclusters.

Figure 6:
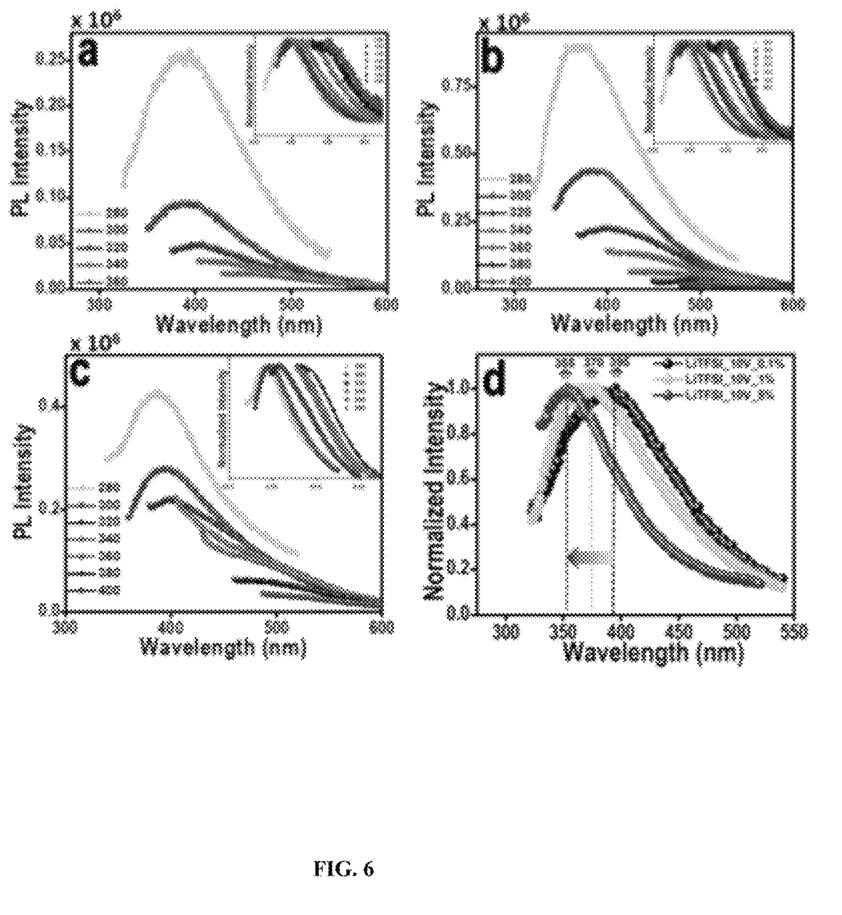
FIG. 6 show emission spectra of MoS2 nanoclusters. Excitation wavelengths are varied and normalized excitation dependent emission spectra are shown for 0.1 wt % (A) and 1 wt % (B) of LiTFSI, and 0.1 wt % (C) and 1 wt % of [BMIm]Cl (D).

Instead of typical excitonic features of bulk or ultrathin $MoS_2$ nanosheets, an absorption shoulder band centred on 370 nm was obtained, which is an evidence for the formation of monodisperse $MoS_2$ nanoclusters. Different emission maxima exhibited by $MoS_2$ nanoclusters of the similar size ~2.5 nm obtained in two different electrolytes pointing towards the role of chemical environment of the nanoclusters in the luminescence emission. As the applied potential increases the exfoliation becomes more vigorous and nanoclusters start dissolving faster. The red shift in the photoluminescence emission spectrum with the increased salt to water ratio of the electrolyte is seen even at a higher applied potential as high as 10V and a concentration as high as 5 wt. % as shown in the FIG. 6.

Figure 7:
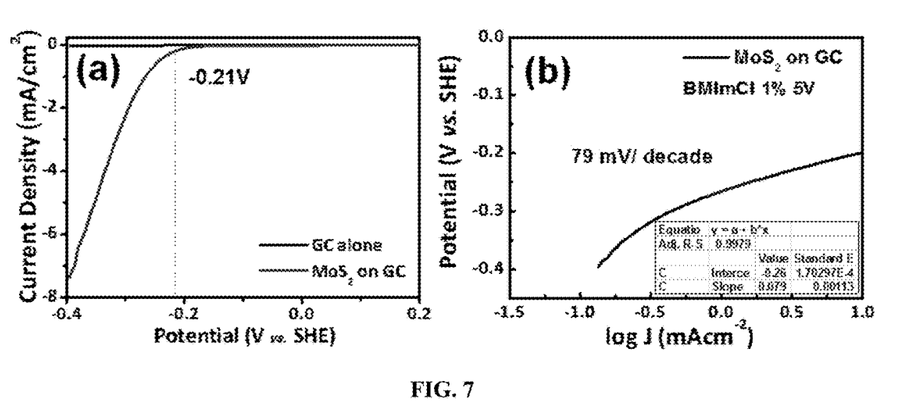
FIG. 7 provides hydrogen evolution reaction (HER) studies. (A) Polarization curves of the $MoS_2$ quantum dots obtained in 0.5 M $H_2SO_4$ at a scan rate of 2 mV/s. (B) Tafel plot of the $MoS_2$ quantum dots.

As a very useful application of the obtained MoS2 nanoclusters, HER performance of the $MoS_2$ quantum dots was studied. The presence of more active sites in the nanosized $MoS_2$ makes it a viable electrocatalyst which gives a low onset potential of 200 mV (FIG. 7). Also, a high current density and a low tafel slope of ~78 mV per decade is observed, which substantiate the high efficiency of as syntehsized quantum dots.

Figure 8:
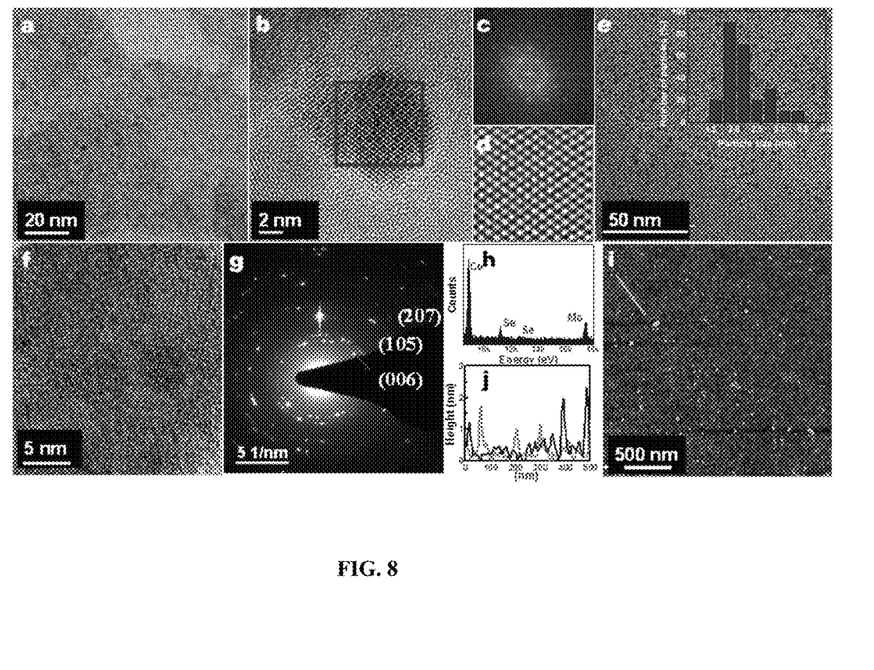
FIG. 8 is TEM images of $MoSe_2$ nanocrystals. (a) TEM image of $MoSe_2$ nanocrystals as found in the exfoliation electrolyte bath. (b) HRTEM image of a single $MoSe_2$ nanocrystal; FFT and IFFT images of the selected area in (b) are shown in (c) and (d), respectively. (e) TEM image of $MoSe_2$ nanocrystals directly deposited (ED) on FTO substrate and re-dispersed in ethanol. (f) and (g) represent HRTEM image and the SAED pattern, respectively, of the ED sample corresponding to 2Hphase. (h) EDX spectrum of the ED sample. (i) AFM image of the $MoSe_2$ nanocrystals and the (j) corresponding height profiles.

Characterization of Molybdenum Diselenide ($MoSe_2$) Quantum Dots Directly Deposited onto Conducting Substrate:

$MoSe_2$ nanocrystals dissolved in the exfoliated solution and deposited on the cathode surface are characterized by TEM images (FIG. 8). $MoSe_2$ nanoparticles of ~2-3 nm size are observed in the TEM image (FIG. 8a), which is a bit fuzzy due to the presence of the electrolyte and other anodic decomposition products. FIG. 8b reveals the hexagonal structure of the nanoparticle present in the exfoliation mixture, and the analysis of the marked area using Fast Fourier Transform (FFT) and inverse FFT as shown in FIGS. 8c and 8d, respectively, confirm the 2H-phase. Further characterization has been carried out by using high-resolution TEM images, selected area electron diffraction (SAED) and energy dispersive X-ray spectrum (EDX), as shown in supplementary FIG. 9. $MoSe_2$ nanocrystals are selectively deposited onto the counter electrode from the electrolyte solution containing exfoliated particles and decomposition products, by virtue of the applied field, and hence, are found to be much neater when re-dispersed in ethanol, compared to the $MoSe_2$ nanocrystals in the exfoliated solution (FIG. 8e). 90% of the particles were of very uniform diameter of ~1.8 nm (FIG. 8e). FIGS. 8f and 8g, show the HRTEM and SAED pattern of the $MoSe_2$ nanocrystals, respectively. EDX spectra (FIG. 8h) acquired on these samples show a Mo to Se ratio of 1:2.3, indicating the presence of chalcogenide terminating edges for the exfoliated nanocrystals. Further, the layer thickness of most of the exfoliated particles was found to be ~≤2 nm which corresponds to three layers or less, as evident from the AFM analysis (FIGS. 8i and 8j).

Figure 9:
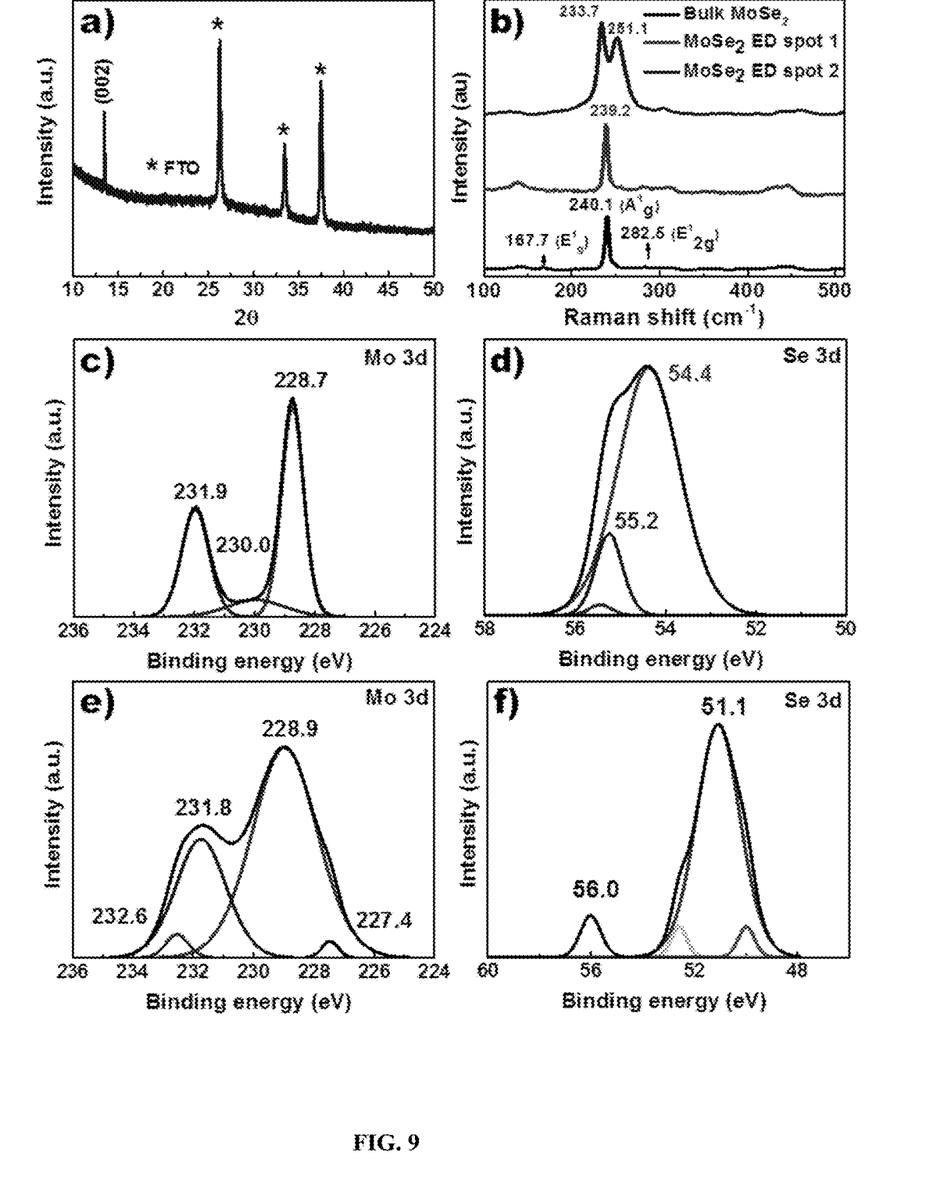
FIG. 9 provides scans for (a) Powder XRD pattern of ED $MoSe_2$ nanocrystals onto FTO after 3 h deposition time (b) Raman spectra of bulk $MoSe_2$ and ED samples taken at two different spots showing different layer thickness. (c) and (e) correspond to the XPS elemental scans for Mo 3d of bulk and ED $MoSe_2$ samples, respectively and (d) and (f) correspond to that of Se 3d of bulk and ED $MoSe_2$ samples, respectively.

Powder X-ray diffraction pattern of $MoSe_2$ electrodeposited on FTO substrate shows (002) peak at 13.45°, close to 13.69° (ICDD Reference code: 00-020-0757), indicating a slight expansion along the c-axis (FIG. 9a). The shift in 2θ corresponds to an expansion of 0.12Å, which is very close to the expansion observed in $2H-MoS_2$ after Li intercalation. Raman spectra of $MoSe_2$ nanocrystals deposited on FTO show two different spectrums indicating the co-existence of mono and few layered $MoSe_2$ as shown in FIG. 9b. The major peak at 240.1 $cm^{-1}$ corresponds to out-of-plane vibrational mode, $A_{1g}$.

The edges of $MoSe_2$ do undergo an oxidative etching method resulting in oxidized Mo and Se edges similar to that of $MoS_2$. This would generally result in the deactivation of electrochemical catalytic activity. However, here the synergistic activity of the free radical scissoring action and the bulky trifluoro-sulphonylimide ion ($TFSI^-$) incorporation induced exfoliation results in the formation of catalytically active, partially edge oxidized and core preserved $MoSe_2$ nanocrystals along with the oxidation products of Mo with +3 and +6 oxidation states.

Understanding the chemical environment of these nanocrystals is important, especially in view of its application in electrocatalysis, and XPS has been used to study their valence states and composition. FIG. 9c shows the XPS spectrum for Mo 3d elemental scan for bulk $MoSe_2$. Peaks at 228.7 and 231.9 eV correspond to $Mo^{+4} 3d_{5/2}$ and $3d_{3/2}$, respectively, and the small peak at 230 eV is attributed to Se 3s. FIG. 9d shows the XPS elemental scan for Se 3d in bulk $MoSe_2$, in which peaks at 54.4 and 55.2 eV are attributed to Se $3d_{5/2}$ and $3d_{3/2}$, respectively. FIGS. 9e and 9f represent the Mo 3d and Se 3d elemental scans, respectively, for the ED samples. Significant broadening of Mo 3d spectra along with slight shift in the binding energy was observed, and peaks centered around 228.9 and 231.8 eV correspond to $Mo^{+4} 3d_{5/2}$ and $3d_{3/2}$, respectively. The broadening might be caused by the difference in the binding energy resulting from the Li incorporation accompanied by the cathodic deposition. Major components of Mo 3d spectra of electrochemically exfoliated and deposited (ED) $MoSe_2$ samples show only a small difference in the binding energy (+0.2 and -0.1 eV for $3d_{5/2}$ and $3d_{3/2}$, respectively) compared to bulk $MoSe_2$ spectra, and proves that the oxidation state of Mo has not changed though it is vulnerable to oxidation under the applied positive potential. Further, lithiation has not resulted in any phase transformation to metallic 1T phase as well, in which case the binding energy would have decreased compared to the bulk. This reluctance for the phase transformation accompanied by lithiation, could be due to the presence of coexisting oxygen deficient molybdenum oxides ($MoO_{3-x}$). XPS evidences, wherein a small new peak emerged at 232.7 eV corresponding to $Mo^{+6}$ of $MoO_3$ (FIG. 9e), and the observed Raman data very well corroborate this possibility. Finally, FIG. 9f shows Se 3d of ED $MoSe_2$. There is huge lowering in the binding energy of Se 3d electrons to 51.1 eV and this could be attributed to the formation of terminal $Se_2^{2-}$ and $Se^{2-}$ upon cathodic deposition, similar to the reports on the lowering of binding energy of S 2p orbitals in $MoS_2$.

Figure 10:
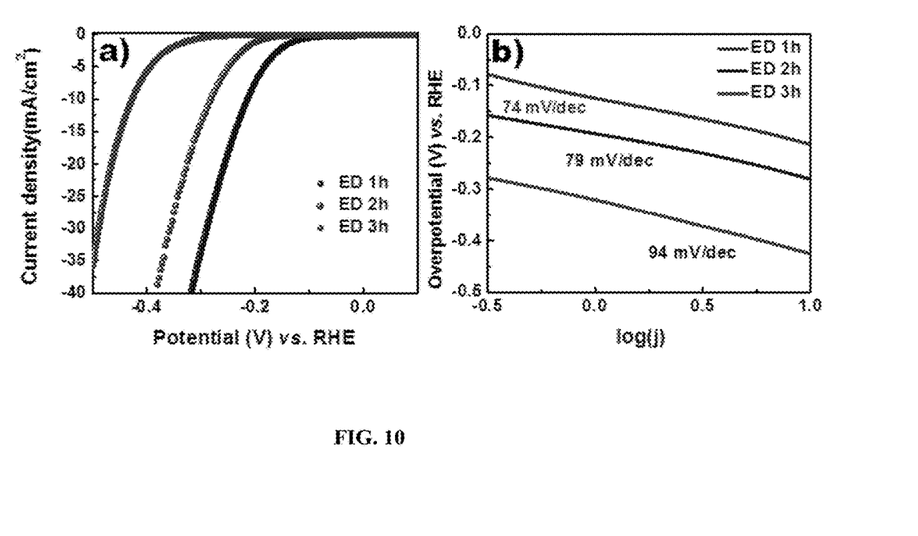
FIG. 10 shows polarization curves. (a) The polarization curves obtained for ED samples fabricated for different deposition time as indicated in the figure at a sweep rate of 2 $mVs^{-1}$ in 0.5 M $H_2SO_4$, and (b) represents the corresponding Tafel slopes.

Electrochemical HER Measurements of Molybdenum Diselenide ($MoSe_2$) Quantum Dots The electrocatalytic activity of $MoSe_2$ nanocrystals towards HER was evaluated using a three-electrode system using 0.5 M $H_2SO_4$ aq. electrolyte with linear sweep voltammetry. As synthesized $MoSe_2$ nanocrystals with 5 wt % nafion solution were drop-casted onto a freshly polished gold working electrode of diameter 1.6 mm (BASi, MF-2014) and dried at room temperature, which acted as the working electrode for the drop casting method. A Pt wire auxiliary electrode (BASi, MW-4130) and an Ag/AgCl reference electrode (BASi, MF-2021) preserved in 3M aq. NaCl solution were used as counter and reference electrodes respectively. The redox properties of the material was studied using cyclic voltammetry by applying a potential ranging from +0.2 V to -0.6 V vs. Ag/AgCl reference electrode at a very slow scan rate of 2 $mVs^{-1}$. $MoSe_2$ nanocrystals were self-assembled (SA) onto gold strip by incubating overnight in the exfoliation mixture after purification using centrifugal concentrator. This was dried in a vacuum desiccator for 48 h and directly used as the working electrode for the SA method. $MoSe_2$ electrodeposited (for 1-3 h) gold foils viz., ED 1 h, ED 2 h and ED 3 h were directly used as working electrodes for electrodialysis (ED) method after washing with deionized (DI) water and ethanol followed by drying under inert conditions. AFM images and depth correlation on the entire scanned area show that the thickness of deposition varies from ~11 μm to ~350 nm as the deposition time varied from 3 h to 1 h. This reduction in the thickness is well reflected in the electrochemical performance as shown in FIG. 10. Optimization of the thickness brought in dramatic improvement in electrocatalytic activity; on set potential and Tafel slope were found to be 98.9 mV vs. RHE and 74 mV $dec^{-1}$, respectively, for the pristine ED 1 h sample. Even when the thickness was reduced to 750 nm for the ED 2 h sample, the mechanism of hydrogen evolution is believed to be the same as that of ED 1 h as evident from the similar Tafel slope (79 mV $dec^{-1}$). ED 1 h is further washed with freshly prepared piranha solution, used to remove organic residues from substrates (mixture of $H_2SO_4$ and 30% $H_2O_2$ in the ratio 3:1) by dipping for 20 sec. After the piranha treatment the electrode was washed with copious amount of distilled water to completely remove the acid and oxidation products. All the potentials are stated after calibrating with respect to the standard reduction potential of reversible hydrogen electrode.

Figure 11:
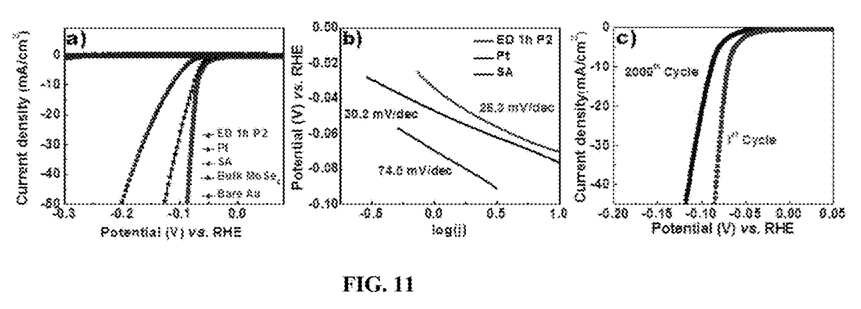
FIG. 11 indicates the catalytic activity (a) Polarization curves obtained for exfoliated $MoSe_2$ modified Au electrodes by direct electrodeposition (ED 1 hP2), Self-Assembly (SA) and Bulk $MoSe_2$, at a scan rate of 2 $mVs^{-1}$ in 0.5 M aq. $H_2SO_4$ electrolyte. Polarization curves for Au substrate and Pt are shown for comparison. (b) Tafel slopes obtained for the best performing electrodes—ED 1 hP2 sample performs better than SA and Pt. (c) Polarization curve obtained for ED 1 hP2 after 2000 potential sweeps is compared with the first cycle to show the stability of catalytic activity.

Exfoliated $MoSe_2$ modified Au electrodes by direct ED 1 h P2 exhibited remarkable electrocatalytic activity for the hydrogen evolution reaction with ultra-high efficiency showing very low over potential and Tafel slope as shown in FIG. 11. The exceptional electrocatalytic activity of $MoSe_2$ nanocrystals, better than Pt, is resulted from the synergistic advantages emerging from improved edge sites, enhanced electronic conductivity and the presence of new and active sites arising upon in-situ lithiation. In a further aspect comparison of the electrocatalytic activity towards hydrogen evolution reaction (HER) for various electrodes fabricated using electrochemically exfoliated $MoSe_2$ nanocrystals has been provided in table below. Characteristic values obtained for the benchmark electrocatalyst Pt are also included. The table clearly shows the results using different parameters and the results exhibited high electrocatalytic efficiency. The performance of the electrocatalyst is typically analyzed by applying a voltage on the electrode material and measuring its current. The threshold potential to be applied to start the hydrogen evolution is very important and is a measure of the electrocatalytic efficiency of the material, which is called onset potential. Smaller the onset potential, better the electrocatalyst. This means, even at the application of very small potential, we get to see the evolution of hydrogen, thanks to the electrocatalyst, which helps in the water splitting process. Over potential at 10 $mAcm^{-2}$ was observed, this is the potential required to raise the reduction current to 10 $mAcm^{-2}$, another universally accepted parameter to compare the catalytic efficiency. In order to measure and analyze the mechanism operating in the HER, Tafel slope was analyzed, which is basically a slope of the plot of log current density against over potential, indicative of the mechanism operating in the HER. A Tafel slope close to 40 mV dec-1 indicates the mechanism operative is Volmer-Heyrovsky. Further, the exchange current density provided in the table is a parameter used to observe the current density when no external potential is applied. For the best electrocatalyst exchange current density should be maximum and Tafel slope should be minimum, which is clearly observed in the table indicating the high electrocatalyst exchange.

TABLE

| Material | Onset Potential (mV vs RHE) at 0.5 mA cm$^{-2}$ | Overpotential (V vs RHE) at 10 mA cm$^{-2}$ | Tafel slope (mV per decade) | Exchange current density (mAcm$^{-2}$) |
| --- | --- | --- | --- | --- |
| Pt | 34.2 | 74.7 | 30.2 | 9.16 |
| Drop casted | 355.6 | — | 42.5 | 0.766 |
| SA | 54.8 | 114.6 | 74 | 0.407 |
| ED 3h | 294.1 | 425.2 | 94.0 | — |
| ED 2h | 169 | 279 | 79 | 0.712 |
| ED 1h | 98.9 | 213.8 | 74 | 0.891 |
| ED 1h P1 | 42.2 | 124.3 | 55.5 | 1.65 |
| ED 1h P2 | 7 | 71.5 | 28.3 | 8.5 |
| ED 1h P3 | 74.8 | 181.4 | 70.3 | 1.73 |
| ED 1h 300 C | 109.0 | 215.7 | 77.0 | — |

ADVANTAGES OF THE INVENTION

The present method of electrochemical exfoliation is very simple, cost effective and completely environmentally friendly, as the electrolyte used is RTILs along with water.

A good control on the size of $MX_2$ quantum dots can be achieved in the present method of electrochemical exfoliation technique, by tuning the experimental parameters.

$MoS_2/MoSe_2$ quantum dots synthesized are extremely useful for several applications, including high performance electro-catalysts for Hydrogen evolution reaction. These materials also have high efficiency and could essentially replace the expensive electro catalysts.

The present method enables to achieve large-scale synthesis with ease and provides a novel approach to extract these materials in powder form in large quantities to realize its large-scale practical applications such as in solar water splitting. The method can easily be scaled up to give a larger yield of high concentration dispersion of such hetero-dimensional $MoS_2/MoSe_2$ nanostructures compared to the known technologies. In addition, these $MoS_2/MoSe_2$ quantum dots could be used in applications such as solar cells and electrochemical energy storage devices such as batteries and supercapacitors.

The invention also enables direct deposition of $MoS_2/MoSe_2$ nanoclusters onto any conducting substrates resulting in highly conducting and efficient electrocatalyst for hydrogen evolution reaction, the best ever reported, even better than the bench mark Pt.

Thin layer of $MoS_2/MoSe_2/WS_2$ or $WSe_2$ nanoclusters directly deposited onto any conducting substrates using the method of the invention, could be used as efficient electrocatalysts for hydrogen evolution reaction for the production of hydrogen by splitting water under the application of a voltage.

The obtained nanoclusters directly coated onto conducting substrates using the method of the invention could be used as efficient catalyst for photocatlytic water splitting to generate hydrogen and could be used as electrode material for supercapacitor or rechargeable lithium/sodium -ion batteries.

The nanoclusters directly deposited onto indium tin oxide (ITO) or fluorine-tin-oxide (FTO), can be used as one of the transparent electrodes for solar cell applications.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of synthesizing quantum dots, the method comprising:
   providing an electrochemical cell comprising an anode, a cathode, and an electrolytic solution, wherein the anode and the cathode are formed from a dichalcogenide material; and
   applying an electric potential between the anode and the cathode for a suitable period to form quantum dots in the electrolytic solution.

2. The method of claim 1, wherein the dichalcogenide has a general formula $MX_2$, wherein M is selected from a group consisting of one or more group VI metals, and X is a chalcogen selected from a group consisting of S, Se, Te or Po.

3. The method claim 2, wherein M is selected from the group consisting of Mo or W.

4. The method of claim 1, wherein the electrolyte solution comprises 1-butyl-3-methylimidazoliumchloride ([BMIm]Cl), 1-ethyl-3-methylimidazolium chloride ([EMIm]Cl), or lithium bis(trifluoromethylsulphonyl)imide (LiTFSI), lithium perchlorate (LiClO$_4$), sodium perchlorate (NaClO$_4$), lithium hexafluoro arsenate (LiAsF$_6$), quarternary phosphonium salts or a combination thereof.

5. The method of claim 1, further comprising separating the quantum dots from the electrolyte solution.

6. The method of claim 1, wherein the quantum dots have a diameter of about 0.5 nm to about 10 nm.

7. The method of claim 1, wherein the concentration of the electrolyte solution is about 0.1 weight percent to about 5 weight percent.

8. The method of claim 1, wherein the quantum dots obtained is a monolayered nanosheets, multi-layered nanosheets, mono-layered nanoclusters, multi-layered nanoclusters or combinations thereof.

9. The method of claim 1, wherein the electric potential applied is less than 5V for about 0.5 hour to about 5 hours.

10. The method of claim 1, wherein the quantum dots exhibit excitation dependent luminescence.

11. A method of synthesizing quantum dots, the method comprising:
    providing an electrochemical cell comprising an anode, a cathode, and an electrolytic solution, wherein the anode is formed from a dichalcogenide material and the cathode is formed from a conducting substrate; and
    applying an electric potential between the anode and the cathode for a suitable period to form deposition of quantum dots on the electrode.

12. The method of claim 11, wherein the dichalcogenide has a general formula $MX_2$, wherein M is selected from a group consisting of one or more group VI metals, and X is a chalcogen selected from a group consisting of S, Se, Te or Po.

13. The method of claim 11, wherein the conducting substrate is selected from the group consisting of gold, fluorine doped tin oxide (FTO), indium doped tin oxide (ITO), carbon nanotube, graphene film, conducting polymer films, and combinations thereof.

14. The method of claim 11, wherein the electrolyte solution comprises 1-butyl-3-methylimidazoliumchloride ([BMIm]Cl), 1-ethyl-3-methylimidazolium chloride ([EMIm]Cl), or lithium bis(trifluoromethylsulphonyl)imide (LiTFSI), lithium perchlorate ($LiClO_4$), sodium perchlorate ($NaClO_4$), lithium hexafluoro arsenate ($LiAsF_6$), quarternary phosphonium salts or a combination thereof.

15. The method of claim 11, wherein the concentration of the electrolyte solution is about 0.1 weight percent to about 5 weight percent.

16. The method of claim 11, further comprising deposition of Lithium ions on the electrode to form Lithiated dichalcogenides.

17. A nanocluster of luminiscent dichalcogenides particles having a general formula $MX_2$, wherein M is selected from the group consisting of Mo and W, and X is selected from the group consisting of S or Se, and particle size of less than 10 nm.

18. The nanocluster of claim 17, wherein the nanocluster comprises one or more layers.

* * * * *